United States Patent
Yoshida et al.

(10) Patent No.: US 12,330,194 B2
(45) Date of Patent: Jun. 17, 2025

(54) CLEANING SYSTEM AND CLEANING METHOD

(71) Applicant: Shin-Etsu Chemical Co., Ltd., Tokyo (JP)

(72) Inventors: Atsushi Yoshida, Niigata (JP); Naruhiro Hoshino, Niigata (JP); Masahiko Ishida, Niigata (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/850,975

(22) Filed: Jun. 27, 2022

(65) Prior Publication Data

US 2023/0001461 A1     Jan. 5, 2023

(30) Foreign Application Priority Data

Jul. 1, 2021   (JP) ................. 2021-110347

(51) Int. Cl.
| | |
|---|---|
| *B08B 9/032* | (2006.01) |
| *B01J 19/00* | (2006.01) |
| *C01B 33/107* | (2006.01) |
| *C11D 7/04* | (2006.01) |
| *F28G 9/00* | (2006.01) |

(52) U.S. Cl.
CPC ......... *B08B 9/0321* (2013.01); *B01J 19/0013* (2013.01); *C01B 33/107* (2013.01); *C11D 7/04* (2013.01); *F28G 9/00* (2013.01); *B01J 2219/00087* (2013.01); *B01J 2219/00247* (2013.01); *B08B 2209/032* (2013.01)

(58) Field of Classification Search
None
See application file for complete search history.

(56) References Cited

U.S. PATENT DOCUMENTS

| | | | |
|---|---|---|---|
| 2016/0264425 A1* | 9/2016 | Ishida | .............. C01B 33/035 |
| 2020/0102223 A1 | 4/2020 | Kamada | |

FOREIGN PATENT DOCUMENTS

| | | | |
|---|---|---|---|
| CN | 203474469 U | * | 3/2014 |
| CN | 103693649 A | * | 4/2014 |
| JP | H03-285811 A | | 12/1991 |
| JP | 2005008430 A | | 1/2005 |
| JP | 2007001791 A | * | 1/2007 |
| JP | 2009280457 A | | 12/2009 |
| JP | 2015081215 A | | 4/2015 |
| JP | 2016-13965 A | | 1/2016 |
| WO | 2018230380 A1 | | 12/2018 |

OTHER PUBLICATIONS

JP2007001791—Machine Translation (Year: 2007).*
CN103693649—Machine Translation (Year: 2014).*
CN203474469—Machine Translation (Year: 2014).*
Office action from corresponding Japanese Patent Application No. 2021-110347 dated Apr. 2, 2024 with English translation.

* cited by examiner

*Primary Examiner* — Marc Lorenzi
(74) *Attorney, Agent, or Firm* — Ladas & Parry, LLP

(57) ABSTRACT

A cleaning system comprise: a first pipe 20 connected to a reactor 10 used for producing polysilicon by using chlorosilane as a raw material; a heat exchanger 30 connected to the first pipe 20; a second pipe 60 provided between the heat exchanger 30 and the first pipe 20; and a driving unit 50 provided at the first pipe 20 or the second pipe 60. A cleaning liquid circulates through the first pipe 20, the heat exchanger 30 and the second pipe 60 by the driving unit 50.

9 Claims, 3 Drawing Sheets

CLEANING SYSTEM AND CLEANING METHOD

TECHNICAL FIELD

The present invention relates to a cleaning system and a cleaning method of cleaning pipe and a heat exchanger connected directly or indirectly to a reactor used for producing polysilicon by using chlorosilane as a raw material.

The present application claims the priority of Japanese Patent Application No. 2021-110347 filed on Jul. 1, 2021, the contents of which are entirely incorporated by reference.

BACKGROUND ART

A polysilicon rod can be produced using chlorosilane as a raw material mainly by a CVD reaction carried out by a Siemens method. As the raw material chlorosilane, high-purity chlorosilane is used, and reaction exhaust gas after the CVD reaction in the reactor is cooled with a heat exchanger and separated into hydrogen and unreacted substance-containing chlorosilane.

The reaction exhaust gas discharged from the reactor contains chlorosilane polymers (chlorosilane oligomers) and has a high boiling point and high viscosity.

When the reactor is opened, air comes into contact with chlorosilanes attached to the inside of the reactor and the exhaust gas tube, so that hydrolysates are also generated and exist as solids.

When the temperature in the reactor becomes high, silicon powder is generated in the inside air of the reactor and deposited on the exhaust gas tube and the heat exchanger.

The highly viscous, high-boiling-point chlorosilane, the hydrolysates described above, and the silicon powder are mixed to become dirt on the wall surface of the pipe or the heat exchanger.

When the high-boiling-point chlorosilane is left to stand in the air, hydrolysis heat accumulates to cause natural ignition. In addition, since hydrogen is generated during hydrolysis, there is a risk of explosion in the sealed space.

JP 03-285811 A describes a method of washing a polymer (high-boiling-point chlorosilane) attached to the inside of pipe with high-boiling-point chlorosilane gas.

JP 2016-13965 A describes a method of hydrolyzing a solid attached to the inside of a device under as inert gas atmosphere.

SUMMARY OF INVENTION

Problem to be Solved by Invention

Examples of a by-product of a CVD reaction using chlorosilane include chlorosilane oligomers. Those included in CVD exhaust gas are typically a mixture of various polymers and exhibit a high boiling point and a high viscosity. When the high-boiling-point chlorosilane (chlorosilane oligomers) is attached to reaction exhaust gas pipe or a heat exchanger surface, pipe clogging and/or a decrease in heat exchange efficiency occur. Thus, the reaction exhaust gas pipe and the heat exchanger should be cleaned periodically.

Meanwhile, JP 03-285811 A states that polymers (high-boiling-point chlorosilane) attached to the inside of pipe are washed with gaseous chlorosilane. However, the actual pipe contains solids as a result of hydrolysis of high-boiling-point chlorosilane with air mixed when the reactor is opened, and silicon powder generated in the air in the reactor. For this reason, in the method in which chlorosilane is vaporized and condensed in the pipe, the physical force for detaching the deposits is weak, and a sufficient cleaning effect cannot be thus exerted.

In addition, JP 2016-13965 A describes a method of hydrolyzing a solid attached to the inside of a device under an inert gas atmosphere, but actually, it takes time to hydrolyze a material in a solid state in pipe.

High-boiling-point chlorosilane attached to reaction exhaust gas pipe and a heat exchanger is generated in the air in the reactor. This includes silicon powder and solids such as hydrolysates generated from air mixed when the reactor is opened. That is, a mixture of the high-boiling-point chlorosilane and the solids is a main component of deposits in the pipe and the heat exchanger.

In a CVD exhaust gas hazard assessment test, the falling test for high-boiling-point chlorosilane is evaluated as grade 8 (very low). By contrast, the falling test for hydrolysates is evaluated as grade 2 (high), and the ballistic mortar test for hydrolysates is evaluated as high as 13 to 28% (TNT). In addition, when high-boiling-point chlorosilane is left to stand in the air, hydrolysis heat accumulates to cause natural ignition. The most hazardous substance is a hydrolysate of high-boiling-point chlorosilane. The occurrence is hard to be prevented during open-air production.

In view of the above contents, the purpose of the present invention is to provide a cleaning system or a cleaning method of easily and safely cleaning pipe and a heat exchanger connected directly or indirectly to a reactor used for producing polysilicon by using chlorosilane as a raw material.

Means for Solving Problem

[Concept 1]
A cleaning system comprising:
a first pipe connected to a reactor used for producing polysilicon by using chlorosilane as a raw material;
a heat exchanger connected to the first pipe;
a second pipe provided between the heat exchanger and the first pipe; and
a driving unit provided at the first pipe or the second pipe, wherein
a cleaning liquid circulates through the first pipe, the heat exchanger and the second pipe by the driving unit.

[Concept 2]
The cleaning system according to concept 1 may further comprise a chlorosilane tank provided at the second pipe and configured to store liquid chlorosilane produced by the heat exchanger, wherein
the chlorosilane stored in the chlorosilane tank may circulate as the cleaning liquid through the first pipe, the heat exchanger, and the second pipe.

[Concept 3]
The cleaning system according to concept 1 or 2 may further comprise a storage unit connected to the first pipe, the second pipe or the heat exchanger, wherein
chlorosilane may be supplied as the cleaning liquid from the storage unit.

[Concept 4]
A cleaning method using the cleaning system according to any one of concepts 1 to 3 may comprise
performing cleaning of the first pipe and the heat exchanger without detaching the first pipe or the heat exchanger from the cleaning system.

DETAILED DESCRIPTION

Figure 1:
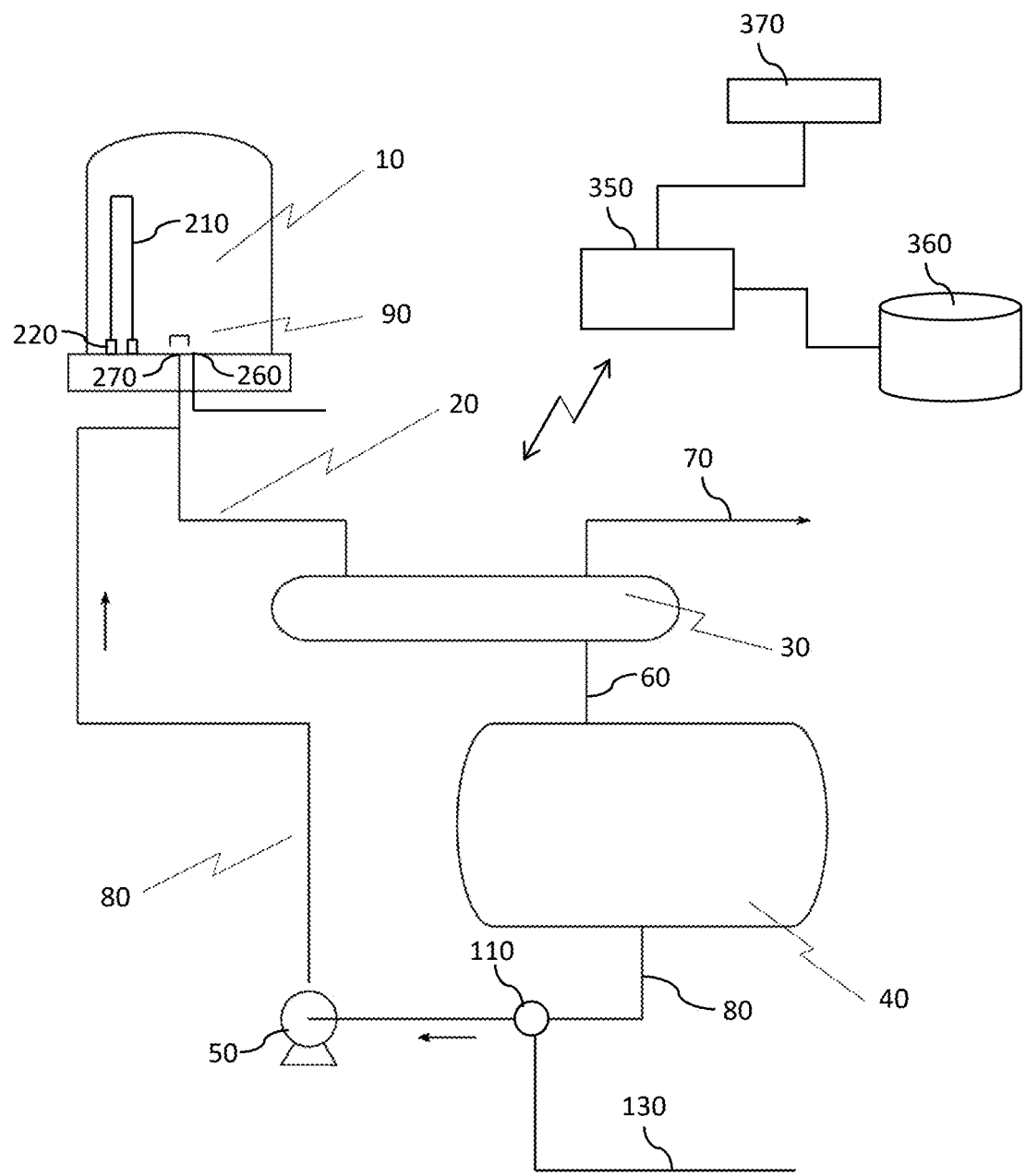
FIG. 1 is a diagram schematically illustrating a reaction system including a cleaning system according to an embodiment of the present invention.

A reaction system in an embodiment of the invention includes one or more reaction apparatuses such as a CVD reaction apparatus for producing polycrystalline silicon.

The reaction apparatus includes a reactor 10, electrodes 220 provided at the reactor 10, U-shaped electrode wiring 210 attached to the electrodes 220, a supply unit 260 for supplying a supply gas to the reactor 10, and a discharge unit 270 for discharging an exhaust gas from the reactor 10. In the reaction apparatus, polycrystalline polysilicon is produced, for example, by using a Siemens method for growing polysilicon by a CVD reaction.

A discharge pipe such as CVD reaction exhaust gas pipe is connected to the discharge unit 270. This discharge pipe is referred to as first pipe 20 in this embodiment. The first pipe 20 is connected to a heat exchanger 30 such as an exhaust gas cooling heat exchanger 30. That is, the exhaust gas is discharged from the reactor 10 such as a CVD reaction apparatus to the heat exchanger 30 via the first pipe 20. If the configuration of this embodiment is not adopted, chlorosilane oligomers (high-boiling-point chlorosilane), hydrolysates, and/or silicon powder accumulate and are deposited onto the first pipe 20 and the heat exchanger 30 at that time.

In the heat exchanger 30, the exhaust gas is cooled to become a liquid containing chlorosilane. Such a chlorosilane liquid produced from the condensed chlorosilanes after the reaction is guided via second pipe 60 to a chlorosilane tank 40. On the other hand, the hydrogen gas, for example, contained in the condensed chlorosilanes after the reaction is discharged from the heat exchanger 30 via regeneration-use hydrogen gas pipe 70. After a predetermined treatment, the hydrogen gas is returned to the reactor 10 and recycled. Although chlorosilane contained in the exhaust gas exhausted from the reactor 10 is in a gaseous state up to the middle of the heat exchanger 30 and the first pipe 20, the chlorosilane is cooled by the heat exchanger 30 and the chlorosilane is in a liquid state on the downstream side of the heat exchanger 30.

Chlorosilane composed of a liquid in the chlorosilane tank 40 receives driving force from a driving unit 50 such as a pump, and is discharged from the chlorosilane tank 40 to the third pipe 80 on a side (lower side in FIGS. 1 and 2) different from the heat exchanger side. As shown in FIG. 1, the third pipe 80 in this embodiment is connected to the first pipe 20. Accordingly, the chlorosilane liquid discharged into the third pipe 80 flows via the first pipe 20 into the heat exchanger 30, and then flows into the chlorosilane tank 40. In this embodiment, circulation of "chlorosilane tank 40→third pipe 80→first pipe 20→heat exchanger 30→second pipe 60→chlorosilane tank 40" is repeated.

Since the high-boiling-point chlorosilane can be dissolved in chlorosilane (monomer), use of chlorosilane as a cleaning liquid enables cleaning. However, material mainly composed of high-boiling-point chlorosilane, chlorosilane hydrolysates, and silicon powder is attached to the first pipe 20 and the heat exchanger 30. Since this material is attached to the pipe wall due to the adhesiveness of high-boiling-point chlorosilane, it is difficult to permeate through and dissolve the material, and no effect is exerted unless chlorosilane for cleaning is made to flow actively and fluid power is imposed on the pipe wall.

Thus, in this embodiment, a configuration is adopted in which a chlorosilane liquid is supplied to the first pipe 20 provided between the reactor 10 and the heat exchanger 30, and the first pipe 20 and the heat exchanger 30 are filled with the chlorosilane liquid. Then, by circulating at as fast a flow rate as possible using the driving unit 50 such as a pump, the high-boiling-point chlorosilane component can be dissolved, and the silicon powder and the hydrolysates can be washed away. Conventionally, it has been necessary to detach and clean the first pipe 20 and the heat exchanger 30 having dirt attached. However, such a configuration as in this embodiment may be adopted to clean the first pipe 20 and the heat exchanger 30 without detaching them as in the conventional case.

Note that a large amount of chlorosilane discharged from the reactor 10 adheres to the first pipe 20 and the upstream side of the heat exchanger 30. However, on the downstream side of the heat exchanger 30, such a large amount of chlorosilane is not attached due to the self-cleaning effect of the chlorosilane that has become a liquid. Therefore, this embodiment can exert, more specifically, a significant effect of cleaning the chlorosilane attached to the first pipe 20 and the upstream side of the heat exchanger 30.

The high-boiling-point chlorosilane and solids, which have been washed away, are concentrated and separated in a subsequent distillation step and so on. The degree of concentration depends on the viscosity of the liquid, but it is desirable that at least 50% of chlorosilane monomers exist as a solvent. The resulting material should have a viscosity so as to be able to flow through pipe including the first pipe 20, the second pipe 60 and the third pipe 80. As a result, detoxification is readily enabled in incineration treatment and/or hydrolysis treatment.

Examples of desirable chlorosilane for cleaning include, but are not limited to, chlorosilane (mainly a mixture of trichlorosilane and silicon tetrachloride) recovered through the first pipe 20 from the viewpoint of quality and cost.

Chlorosilane collected from the exhaust gas temporarily stored in the chlorosilane tank 40 after liquefied and condensed is supplied to and circulated through the first pipe 20, which is an exhaust gas line, by the driving unit 50 such as a cleaning-use chlorosilane pump. Then, the deposits can be removed.

The cleaning liquid temporarily stored in the chlorosilane tank 40 after completion of the cleaning can be processed in substantially the same manner as for a typical CVD exhaust gas condensed liquid, and is eventually hydrolyzed or incinerated. Specifically, fourth pipe 130 connected to the third pipe 80 is provided. The chlorosilane liquid used for cleaning is discharged through the fourth pipe 130, and is then hydrolyzed or incinerated.

A switching unit 110 such as a valve or a switching valve is provided at a connection part between the fourth pipe 130 and the third pipe 80. Circulation of "chlorosilane tank 40→third pipe 80→first pipe 20→heat exchanger 30→chlorosilane tank 40" may be repeated. In this case, the switching unit 110 may execute control such that the cleaning liquid does not flow into the fourth pipe 130. On the other hand, a cleaning liquid composed of a chlorosilane liquid may be discharged. In this case, the cleaning liquid may flow only into the fourth pipe 130 by means of the switching unit 110, and the cleaning liquid composed of a chlorosilane liquid does not flow into the third pipe 80 on the downstream side of the switching unit 110.

A closing part configured to prevent chlorosilane from flowing into the reactor 10 from a discharge unit 270 when chlorosilane is circulated may be provided between the reactor 10 and a connection part between the first pipe 20 and the third pipe 80 or in the reactor 10. Providing such a closing part makes it possible to prevent a cleaning liquid such as a chlorosilane liquid to be circulated from erroneously flowing into the reactor 10. The closing part may be a closing cap 90 (see FIG. 1) used for circulation cleaning. It is also conceivable to provide a closing valve 150 as the closing part (see FIG. 2). However, since the temperature tends to be high in the reactor 10 and in the vicinity thereof, it may be difficult to use the closing valve 150 as the closing part. In this regard, by adopting a structure like the closing cap 90, it is possible to prevent a cleaning liquid such as a chlorosilane liquid from erroneously flowing into the reactor 10 at low cost without any concern about the problem of heat.

Conditions related to the cleaning effect include an in-tube linear velocity, a liquid temperature, and a cleaning time.

The faster the in-tube linear velocity, the better. The velocity may be 0.01 m/s or more, and preferably 0.1 m/s or more. The higher the cleaning temperature, the better. The cleaning temperature may be 10° C. or higher, and preferably 25° C. or higher. However, when the cleaning temperature exceeds the boiling point of chlorosilane as a circulation liquid, cavitation occurs on the suction side of the pump. Thus, it is preferable that the cleaning temperature does not exceed the boiling point of chlorosilane. The circulation time depends on the thickness of the high-boiling-point chlorosilanes deposited inside, but the time from filling to circulation/discharge is from 2 to 48 hours. This conditions are favorable. During this time, polycrystalline silicon cannot be produced using the reaction apparatus. As a result, it is beneficial that cleaning can be performed quickly and efficiently in order to secure the operating time of the apparatus.

Modification Embodiment

Figure 2:
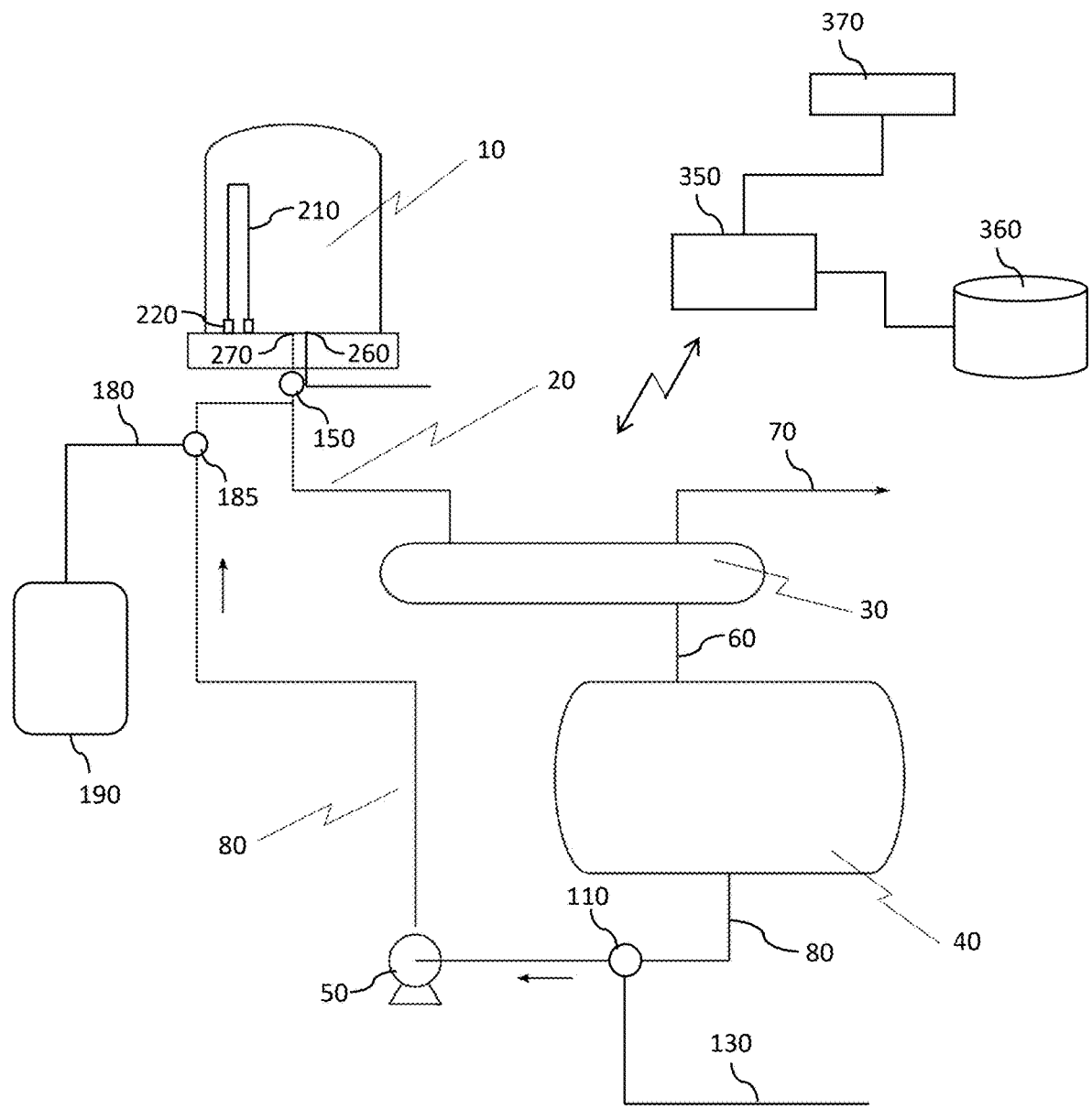
FIG. 2 is a diagram schematically illustrating a reaction system including a cleaning system according to a modification embodiment of the present invention.

In view of the above, the description has been given using the configuration in which chlorosilane discharged from the reactor 10 is liquefied and the liquefied chlorosilane is circulated. However, the present invention is not limited to such a configuration. For example, as shown in FIG. 2, a cleaning liquid such as a chlorosilane liquid may be supplied from a storage unit 190 having the cleaning liquid stored. The storage unit 190 may be connected via fifth pipe 180 to the third pipe 80. Note that the present invention is not limited to such a configuration, and the fifth pipe 180 may be necessarily connected to the first pipe 20 or may be connected to the heat exchanger 30.

A switching unit 185 may be provided between the fifth pipe 180 and the third pipe 80. The switching unit 185 may be controlled, and the inflow of the cleaning liquid from the storage unit 190, and the circulation of the cleaning liquid through the third pipe 80 to the first pipe 20 may be switched. As another configuration, both the chlorosilane liquid stored in the chlorosilane tank 40 and the chlorosilane liquid supplied from the external storage unit 190 may be used as the cleaning liquid.

The cleaning liquid supplied from the external storage unit 190 may be liquid different from chlorosilane. When the chlorosilane liquid stored in the chlorosilane tank 40 and the cleaning liquid supplied from the storage unit 190 are mixed and used, the type, concentration, and the like of the liquid supplied from the storage unit 190 may be changed, if appropriate. If such a configuration is adopted, it is advantageous in that a highly effective cleaning liquid can be suitably selected.

The ON/OFF of driving of the driving unit 50 may be selected (the intensity may be switched). The switching unit 110 and/or the switching unit 185 may be used to switch the flow of the cleaning liquid. In this case, an operator may input the operation from an input unit 370 including, for instance, a personal computer, a smartphone, or a tablet terminal. However, the present invention is not limited to such a configuration. A series of procedures such as a recipe may be stored in a memory unit 360. A control unit 350 may read such a procedure from the memory unit 360, and control, for instance, the driving unit 50, the switching unit 110, and/or the switching unit 185 in response to a command from the control unit 350.

EXAMPLES

Figure 3:
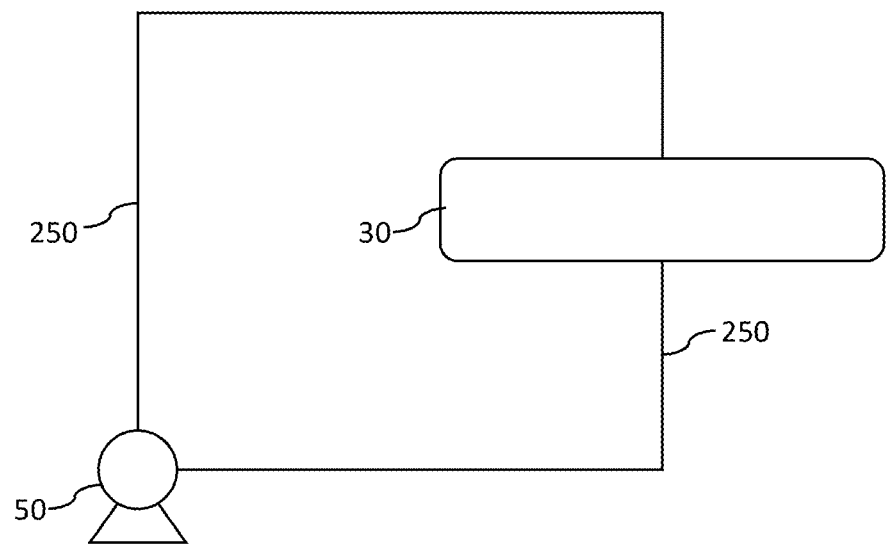
FIG. 3 is a schematic diagram showing the configuration when an Example in the present invention is implemented.

The configuration as shown in FIG. 3 was used. A heat exchanger 30 having high-boiling-point chlorosilane and hydrolysates attached was filled with silicon tetrachloride, and subjected to circulation cleaning. Thereafter, the composition of high-boiling-point materials contained in the resulting cleaning liquid was examined. In addition, the cleaned heat exchanger 30 was opened, and deposits inside were examined.

The checked matters will be described.

As the heat exchanger 30 for cleaning, one having a reaction gas passage volume of about 50,000 ton and a heat transfer area of 160 m² was used.

The chlorosilane for cleaning used was 1.45 m³ of silicon tetrachloride.

The in-tube linear velocity was 0.1 m/s.

When the chlorosilane for cleaning was made to circulate using a pipe 250 in the above configuration as shown in FIG. 3, the weight of the cleaning liquid was increased by about 80 kg. The cleaning liquid was analyzed by NMR (29Si).

$$STC:Si_2Cl_6:Si_2HCl_5=92.6:0.2:0.2 \text{ mol}.$$

The weight was 12.7 kg.

For checking, the heat exchanger 30 was opened. However, no deposits were found. This has demonstrated the effectiveness of chlorosilane cleaning.

The above has demonstrated that the heat exchanger 30 was effectively cleaned by circulating the chlorosilane liquid.

REFERENCE SIGNS LIST

10 Reactor
20 First pipe
30 Heat exchanger
40 Chlorosilane tank
50 Driving unit
60 Second pipe
190 Storage unit

The invention claimed is:
1. A cleaning system comprising:
   a flow circulation path connected to a CVD reaction apparatus used for producing polysilicon by using a Siemens method and chlorosilane as a raw material;

a heat exchanger producing liquid chlorosilane from exhaust gas including chlorosilane from the CVD reaction apparatus;

a chlorosilane tank configured to store the liquid chlorosilane; and a driving unit provided along the flow circulation path, wherein the driving unit is configured to circulate the liquid chlorosilane as a cleaning liquid through the flow circulation path comprising the heat exchanger and the chlorosilane tank, wherein the flow circulation path comprises a first flow circulation path connecting the CVD reaction apparatus and the heat exchanger, and the liquid chlorosilane is capable of filling the first flow circulation path, wherein the liquid chlorosilane repeatedly circulated in the flow circulation path comprising the heat exchanger and the chlorosilane tank by the driving unit does not pass through any parts of the CVD reaction apparatus, and wherein the cleaning system further comprises:

a discharge pipe configured to discharge the liquid chlorosilane used to clean the flow circulation path for being hydrolyzed or incinerated; and a switching unit configured to switch between a cleaning state in which the liquid chlorosilane repeatedly circulates in the flow circulation path and cleans the flow circulation path comprising the heat exchanger and the chlorosilane tank, and a discharge state in which the liquid chlorosilane used to clean the flow circulation path is discharged to the discharge pipe and the liquid chlorosilane does not circulate in the flow circulation path.

2. The cleaning system according to claim 1, further comprising:

a storage unit connected to the flow circulation path, wherein the liquid chlorosilane stored in the chlorosilane tank and liquid chlorosilane in the storage unit circulates as the cleaning liquid.

3. The cleaning system according to claim 1, wherein the liquid chlorosilane as the cleaning liquid circulates at 0.01 m/s or more.

4. The cleaning system according to claim 1, wherein a temperature of the liquid chlorosilane as the cleaning liquid is 10° C. or higher.

5. The cleaning system according to claim 1, wherein a time of circulation of the liquid chlorosilane as the cleaning liquid is from 2 to 48 hours.

6. The cleaning system according to claim 1, wherein the flow circulation path comprises a second flow circulation path connecting the heat exchanger and the chlorosilane tank, and a third flow circulation path connecting the chlorosilane tank and the first flow circulation path, wherein the driving unit is provided along the third flow circulation path.

7. The cleaning system according to claim 2, wherein the storage unit is connected to the heat exchanger.

8. A cleaning method using the cleaning system according to claim 1, comprising:

performing cleaning of the flow circulation path without detaching the flow circulation path.

9. A cleaning method using the cleaning system according to claim 2, comprising:

performing cleaning of the flow circulation path without detaching the flow circulation path.

* * * * *